United States Patent [19]
Saito et al.

[11] Patent Number: 5,820,517
[45] Date of Patent: Oct. 13, 1998

[54] CONTROL SYSTEM FOR INTERNAL COMBUSTION ENGINES FOR AUTOMOTIVE VEHICLES

[75] Inventors: Yoshiharu Saito; Kazutomo Sawamura; Tetsuya Ono, all of Wako, Japan

[73] Assignee: Honda Giken Kogyo Kabushiki Kaisha, Tokyo, Japan

[21] Appl. No.: 848,277

[22] Filed: Apr. 29, 1997

[30] Foreign Application Priority Data

Apr. 30, 1996 [JP] Japan .................................. 8-132777

[51] Int. Cl.⁶ .................................................. F02D 41/04
[52] U.S. Cl. ............................................................. 477/109
[58] Field of Search .................................... 477/109, 111

[56] References Cited

U.S. PATENT DOCUMENTS 5,445,576  8/1995  Motamedi et al. ..................... 477/109

Primary Examiner—Dirk Wright
Attorney, Agent, or Firm—Armstrong, Westerman, Hattori, McLeland & Naughton

[57] ABSTRACT

An upshift of an automatic transmission of an automotive vehicle is carried out when a sudden decrease in a stepping-on amount of an accelerator pedal of the vehicle is detected. The opening of a throttle valve arranged in an intake passage of an internal combustion engine installed on the vehicle is closed when the stepping-on amount of the accelerator has increased during the upshift after the sudden decrease in the stepping-on amount. Engagement of one of speed clutches of the automatic transmission to be selected for the upshift is started upon the closing of the throttle valve. Control of the opening of the throttle valve in response to the stepping-on amount of the accelerator pedal is started after the rotational speed of the output side of the one of the speed clutches and the rotational speed of the input side of the same become substantially equal to each other through the engagement of the one of the speed clutches.

3 Claims, 6 Drawing Sheets

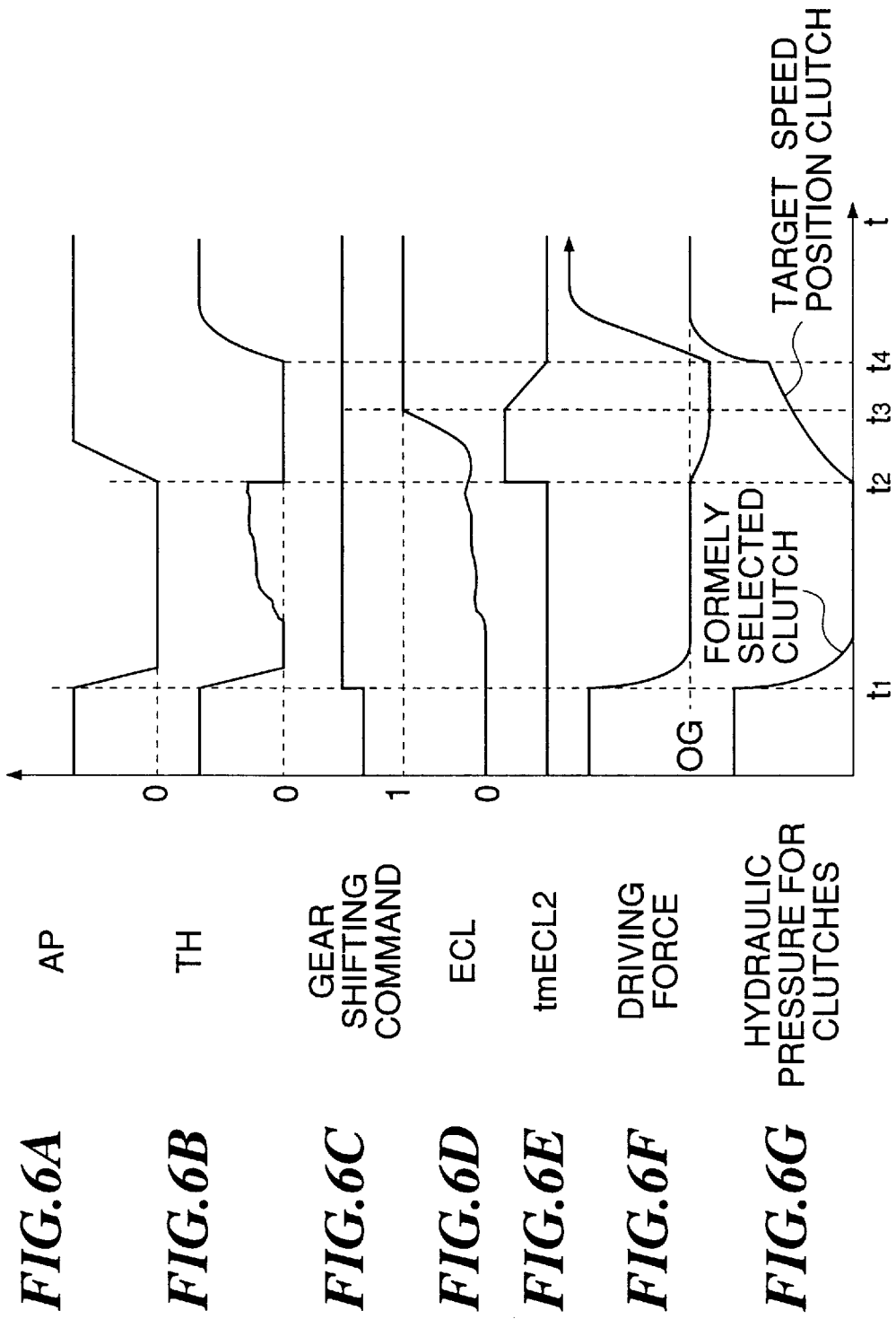

CONTROL SYSTEM FOR INTERNAL COMBUSTION ENGINES FOR AUTOMOTIVE VEHICLES

BACKGROUND OF THE INVENTION

1. Field of the Invention

This invention relates to a control system for internal combustion engines for automotive vehicles, and more particularly to a control system of this kind which is capable of reducing a shock caused by gear shifting carried out upon release of an accelerator pedal of the vehicle.

2. Prior Art

Conventionally, in an automatic vehicle with an automatic transmission, the gear shift position of the transmission is automatically shifted when a sharp change in the position of the accelerator pedal toward a lesser stepping-on amount thereof is detected during traveling of the vehicle (gear shifting responsive to release of the accelerator pedal).

When an upshift is carried out in response to release of the accelerator pedal, hydraulic pressure for operating a target speed position clutch (i.e. a clutch to be engaged through gear shifting) is set to a low level at the start of the gear shifting so as to reduce a shock caused by the upshift.

FIGS. 1A to 1E show changes in a gear shifting command, throttle valve opening TH, engine rotational speed NE, the driving force of the vehicle, and hydraulic pressures for operating a formerly selected clutch (i.e. a clutch engaged before the gear shifting) and the target speed position clutch of the automatic transmission, respectively, which take place when an upshift is carried out in response to release of the accelerator pedal by setting the hydraulic pressure for operating the target speed position clutch to a low level at the start of the gear shifting.

As shown in the figures, when the throttle valve opening TH is sharply decreased upon release of the accelerator pedal, a gear shifting command is issued (time point t1). Accordingly, the hydraulic pressure for operating the formerly selected clutch is progressively reduced, whereby the formerly selected clutch starts to be disengaged, while the hydraulic pressure for operating the target speed position clutch is progressively increased, whereby the target speed position clutch starts to be engaged. In the process of the upshift, before the formerly selected clutch becomes completely disengaged, the driving force of the vehicle sharply drops due to a sudden decrease in the output torque of the engine caused by the release of the accelerator pedal (a state in which so-called engine brake is applied), and then progressively rises as the disengagement of the formerly selected clutch and the engagement of the target speed position clutch proceed.

However, if an upshift is carried out upon or in response to release of the accelerator pedal by setting hydraulic pressure for operating a target speed position clutch to a low level at the start of the gear shifting, as shown in FIG. 1E, the following problem arises: When the accelerator pedal is again stepped on during the upshift (time point t2 in the timing chart of FIGS. 1A–1E), in some cases, the hydraulic pressure for operating the target speed position clutch cannot be timely increased to a sufficiently high level, which results in a sudden rise in the engine rotational speed due to an increase in the throttle valve opening TH.

On the other hand, if the hydraulic pressure for operating the target speed position clutch is set to such a high level at the start of the upshift as to cope with a sudden rise in the engine rotational speed which can be caused by the stepping-on of the accelerator pedal during the upshift as mentioned above, as shown in FIG. 2E, the driving force of the vehicle sharply increases, as indicated by a point A in FIG. 2D, causing a gear shifting shock.

SUMMARY OF THE INVENTION

It is the object of the invention to provide a control system for internal combustion engines for automotive vehicles, which is capable of preventing a gear shifting shock caused by an upshift upon release of the accelerator pedal.

To attain the above object, the invention provides a control system for an internal combustion engine for an automotive vehicle, the vehicle having an accelerator pedal, and an automatic transmission, the automatic transmission having a plurality of speed clutches, the speed clutches each having an input side and an output side, the engine having an intake passage, and a throttle valve arranged in the intake passage.

The control system according to the invention is characterized by comprising:

stepping-on amount-detecting means for detecting a stepping-on amount of the accelerator pedal;

upshifting means for carrying out an upshift of the automatic transmission when the stepping-on amount-detecting means detects a sudden decrease in the stepping-on amount;

throttle valve opening control means for closing the throttle valve when the stepping-on amount has increased during the upshift after the sudden decrease in the stepping-on amount; and clutch control means for starting engagement of one of the speed clutches to be selected for the upshift upon the closing of the throttle valve by the throttle valve control means;

the throttle valve opening control means starting control of opening of the throttle valve in response to the stepping-on amount of the accelerator pedal after rotational speed of the output side of the one of the speed clutches and rotational speed of the input side of the one of the speed clutches become substantially equal to each other through the engagement of the one of the speed clutches effected by the clutch control means.

Preferably, the throttle valve opening control means starts the control of the opening of the throttle valve upon lapse of a predetermined time period after the rotational speed of the output side of the one of the speed clutches and the rotational speed of the input side of the one of the speed clutches become substantially equal to each other.

Preferably, the predetermined time period is set to a time period required for hydraulic pressure for operating the one of the speed clutches to become high enough to engage the one of the speed clutches.

The above and other objects, features, and advantages of the invention will become more apparent from the following detailed description taken in conjunction with the accompanying drawings.

BRIEF DESCRIPTION OF THE DRAWINGS

FIGS. 1A to 1E collectively form a timing chart showing changes in engine operating parameters which take place when an upshift is carried out upon release of an accelerator pedal of an automotive vehicle with hydraulic pressure for operating a target speed position clutch set to a low level, according to the prior art, in which:

FIG. 1A shows a change in a gear shifting command;

FIG. 1B shows a changes in throttle valve opening TH;

FIG. 1C shows a change in engine rotational speed NE;

FIG. 1D shows a change in the driving force of the vehicle; and

FIG. 1E shows changes in hydraulic pressures for operating a formerly selected clutch and the target speed position clutch;

FIGS. 2A to 2E collectively form another timing chart similar to FIGS. 1A to 1E, showing changes in the engine operating parameters which take place when an upshift is carried out upon release of the accelerator pedal of the vehicle with the hydraulic pressure for operating the target position clutch to a higher level, according to the prior art, in which:

FIG. 2A shows a change in the gear shifting command;

FIG. 2B shows a change in the throttle valve opening TH;

FIG. 2C shows a change in the engine rotational speed NE;

FIG. 2D shows a change in the driving force of the vehicle; and

FIG. 2E shows changes in the hydraulic pressures for operating the formerly selected clutch and the target speed position clutch;

FIGS. 6A to 6G collectively form a timing chart showing changes in engine operating parameters when an upshift is carried out in response to release of the accelerator pedal, according to the embodiment, in which:

FIG. 6A shows a change in the accelerator opening AP;

FIG. 6B shows a change in the throttle valve opening TH;

FIG. 6C shows a change in the gear shifting command;

FIG. 6D shows a change in the input/output rotational speed ratio ECL of the target speed position clutch;

FIG. 6E shows a change in the count of the ECL-determining timer tmECL2;

FIG. 6F shows a change in the driving force of the vehicle; and

FIG. 6G shows changes in the hydraulic pressures for operating the formerly selected clutch and the target speed position clutch.

DETAILED DESCRIPTION

The invention will now be described in detail with reference to the drawings showing an embodiment thereof.

Figure 1:
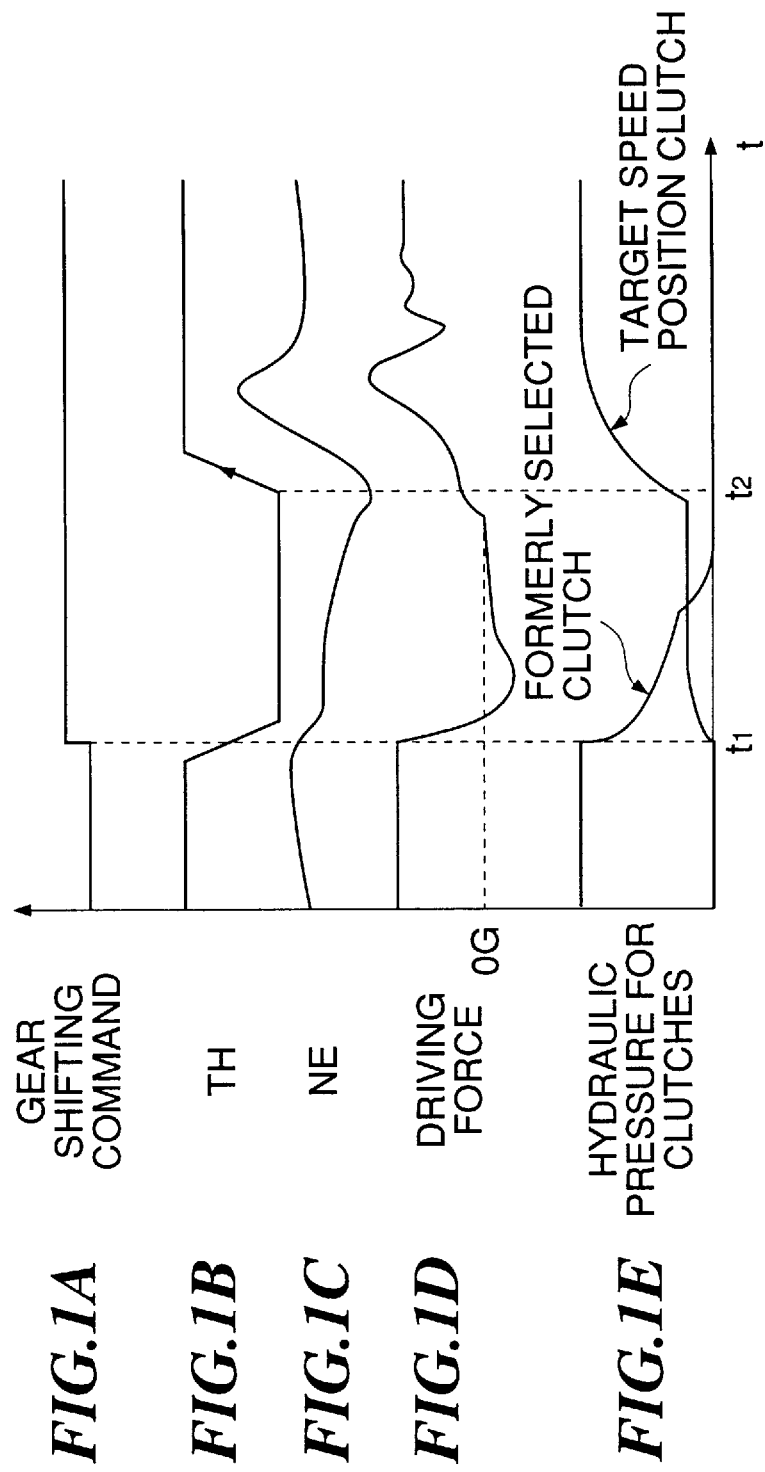
Figure 2:
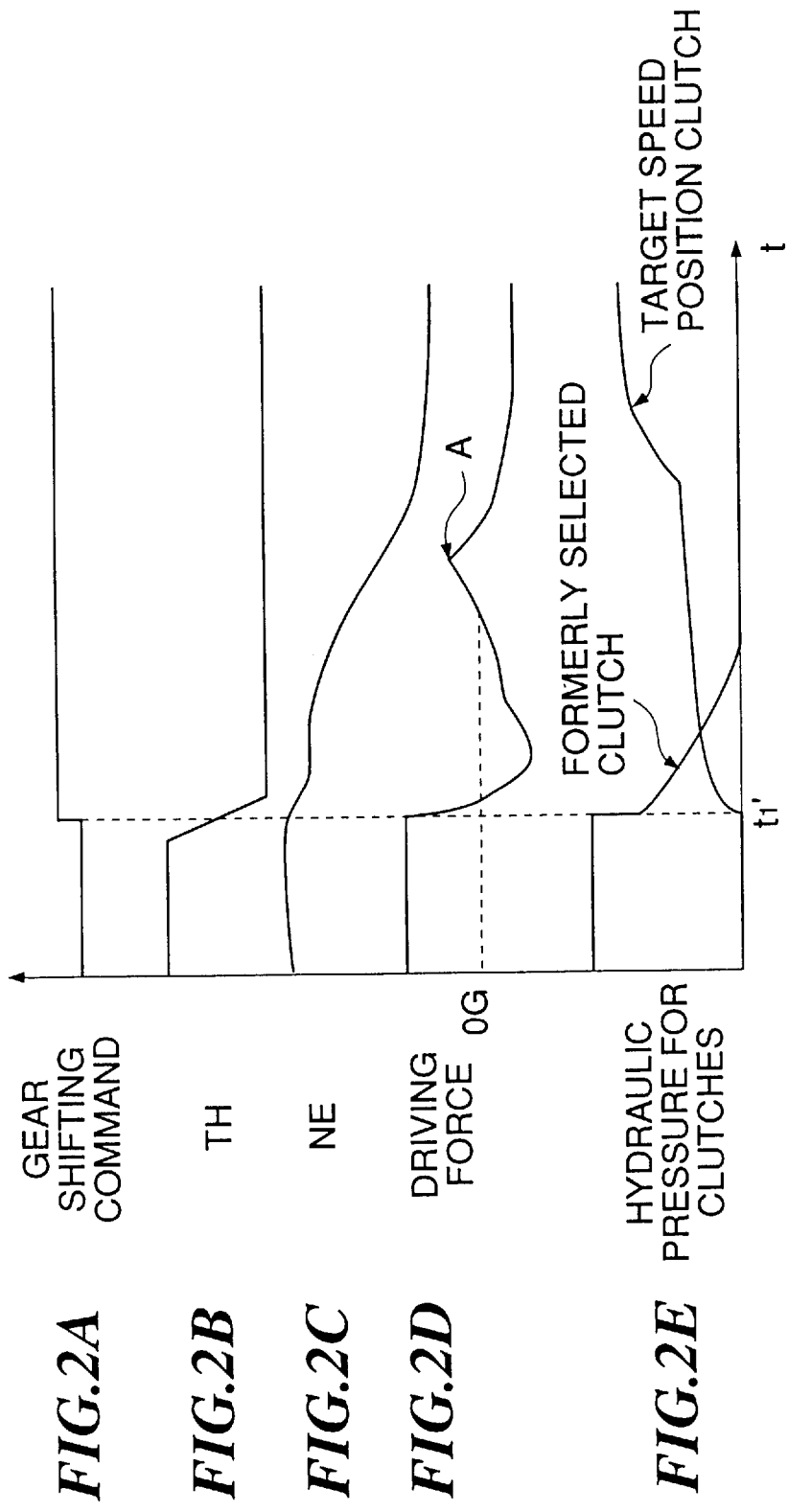
Figure 3:
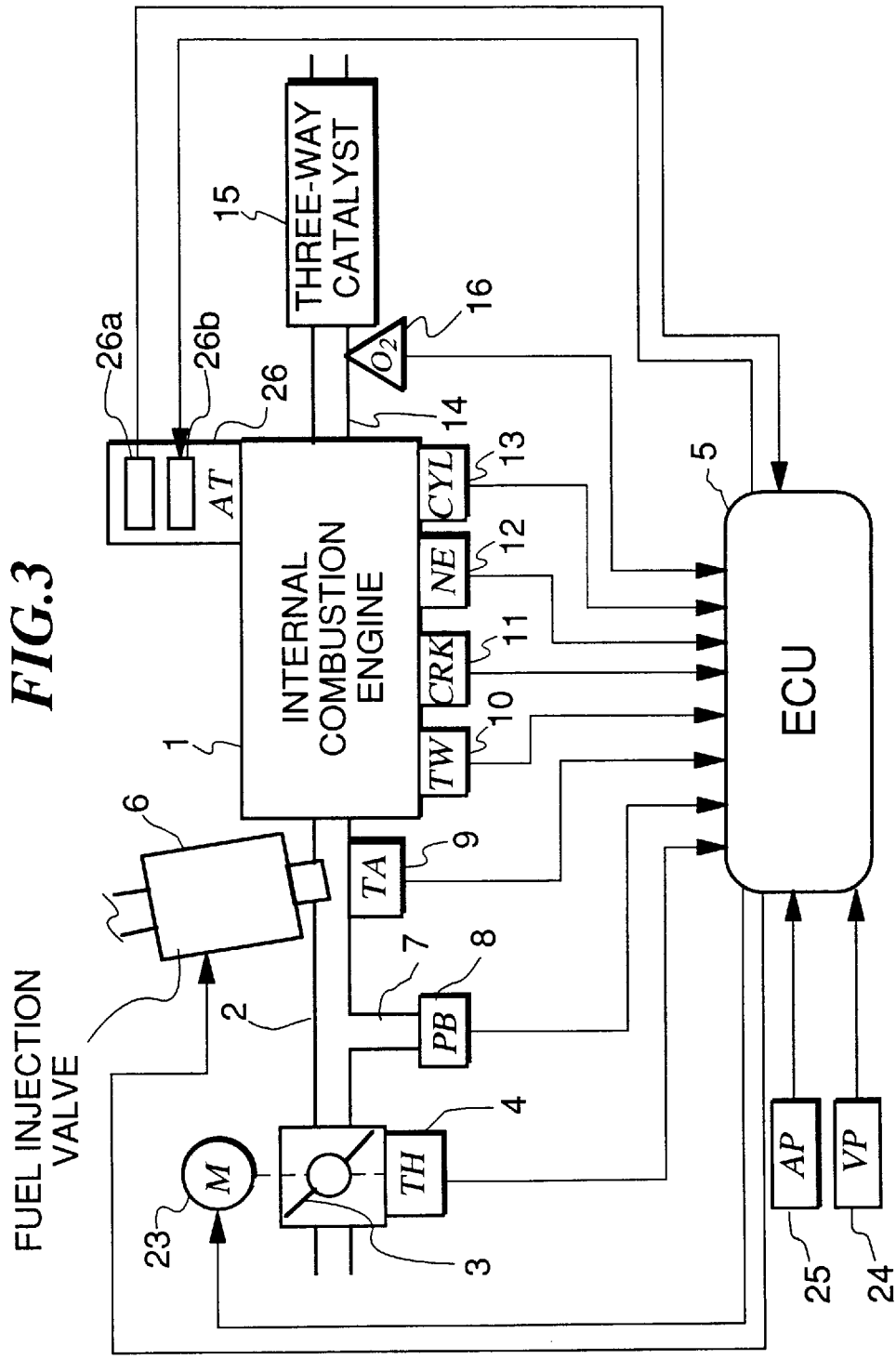
FIG. 3 is a block diagram schematically showing the whole arrangement of an internal combustion engine and a control system therefor, according to an embodiment of the invention.

Referring first to FIG. 3, there is illustrated the whole arrangement of an internal combustion engine (hereinafter simply referred to as "the engine") and a control system therefor, according to an embodiment of the invention. In the figure, reference numeral 1 designates an internal combustion engine for an automotive vehicle, which has a cylinder block to which is connected an intake pipe 2. A throttle valve 3 is arranged in the intake pipe 2. A throttle valve opening (TH) sensor 4 is connected to the throttle valve 3 and electrically connected to an electronic control unit (hereinafter referred to as "the ECU") 5, for supplying an electric signal indicative of the sensed throttle valve opening TH to the ECU 5.

Further electrically connected to the ECU 5 are a throttle actuator 23 for driving the throttle valve 3 and the position or travel of an accelerator opening (AP) sensor 25 for detecting an accelerator pedal, not shown, (hereinafter also referred to as "the accelerator opening"). The ECU 5 controls the operation of the throttle actuator 23 during the accelerator pedal position AP detected by the accelerator opening sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3, for sensing absolute pressure or intake pressure (PBA) within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electric signal indicative of the sensed engine coolant temperature TW to the ECU 5.

A cylinder-discriminating (CYL) sensor (hereinafter referred to as "the CYL sensor") 13, an engine rotational speed (NE) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine. The NE sensor 12 generates a signal pulse (hereinafter referred to as "a TDC signal pulse") at each of predetermined crank angles (e.g. whenever the crankshaft rotates through 180 degrees when the engine is of the four-cylinder type) which each correspond to a predetermined crank angle before a top dead center (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

Further electrically connected to the ECU 5 is an automatic transmission 26 which is a conventional type and provided with a hydraulic pressure control circuit 26b for controlling the operations of a lock-up clutch and a gear mechanism of the transmission, neither of which is shown, and a gear position sensor 26a for detecting the gear shift position of the gear mechanism. The hydraulic pressure control circuit 26b and the gear position sensor 26a are electrically connected to the ECU 5. The hydraulic pressure control circuit 26b drives gear-shifting linear solenoid valves, not shown, of the gear mechanism for controlling hydraulic pressure for operating clutches of the transmission.

A three-way catalyst (catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5. Further electrically connected to the ECU 5 is a vehicle speed sensor 24 for detecting the traveling speed (vehicle speed) VP of the automotive vehicle in which the engine 1 is installed and supplying a signal indicative of the sensed vehicle speed VP to the ECU 5.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU"), memory means storing various operational programs which are executed by the CPU, and for storing results of calculations therefrom, etc., and an output circuit which supplies driving signals to the fuel injection valves 6, the throttle actuator 23, etc., and also supplies control signals to the hydraulic pressure control circuit 26b.

The CPU of the ECU 5 operates during signals from various engine operating parameter sensors including those mentioned above to determine operating conditions in which the engine 1 is operating, such as an air-fuel ratio feedback control region in which air-fuel ratio control of a mixture supplied to the engine 1 is carried out in response to oxygen concentration in exhaust gases detected by the O2 sensor 16, and air-fuel ratio open-loop control regions, and calculates, based upon the determined engine operating conditions, a fuel injection period TOUT for each of the fuel injection valves 6, in synchronism with generation of TDC signal pulses, by the use of the following equation (1):

$$TOUT = Ti \times KO2 \times K1 + K2 \quad (1)$$

where Ti represents a basic value of the fuel injection period TOUT, which is determined according to the engine rotational speed NE and the intake pipe absolute pressure PBA, by the use of a Ti map, not shown, stored in the memory means.

KO2 represents an air-fuel ratio correction coefficient calculated based on the output signal from the O2 sensor 16, which is calculated to such a value that the air-fuel ratio of the air-fuel mixture supplied to the engine 1 becomes equal to a desired air-fuel ratio when the engine 1 is operating in the air-fuel ratio feedback control region, while it is set to predetermined values corresponding to the respective air-fuel ratio open-loop control regions of the engine 1 when the engine is in these open-loop control regions.

K1 and K2 represent other correction coefficients and correction variables, respectively, which are set according to engine operating parameters to such values as optimize engine operating characteristics, such as fuel consumption and engine accelerability.

Driving signals corresponding to the fuel injection period TOUT calculated as above are delivered from the ECU 5 via the output circuit to the fuel injection valves 6 to drive them. Further, the CPU controls the engaged state of the lock-up clutch, the gear shift position of the gear mechanism, the valve opening TH of the throttle valve 3 in response to output signals from various engine operating parameter sensors.

Figure 4:
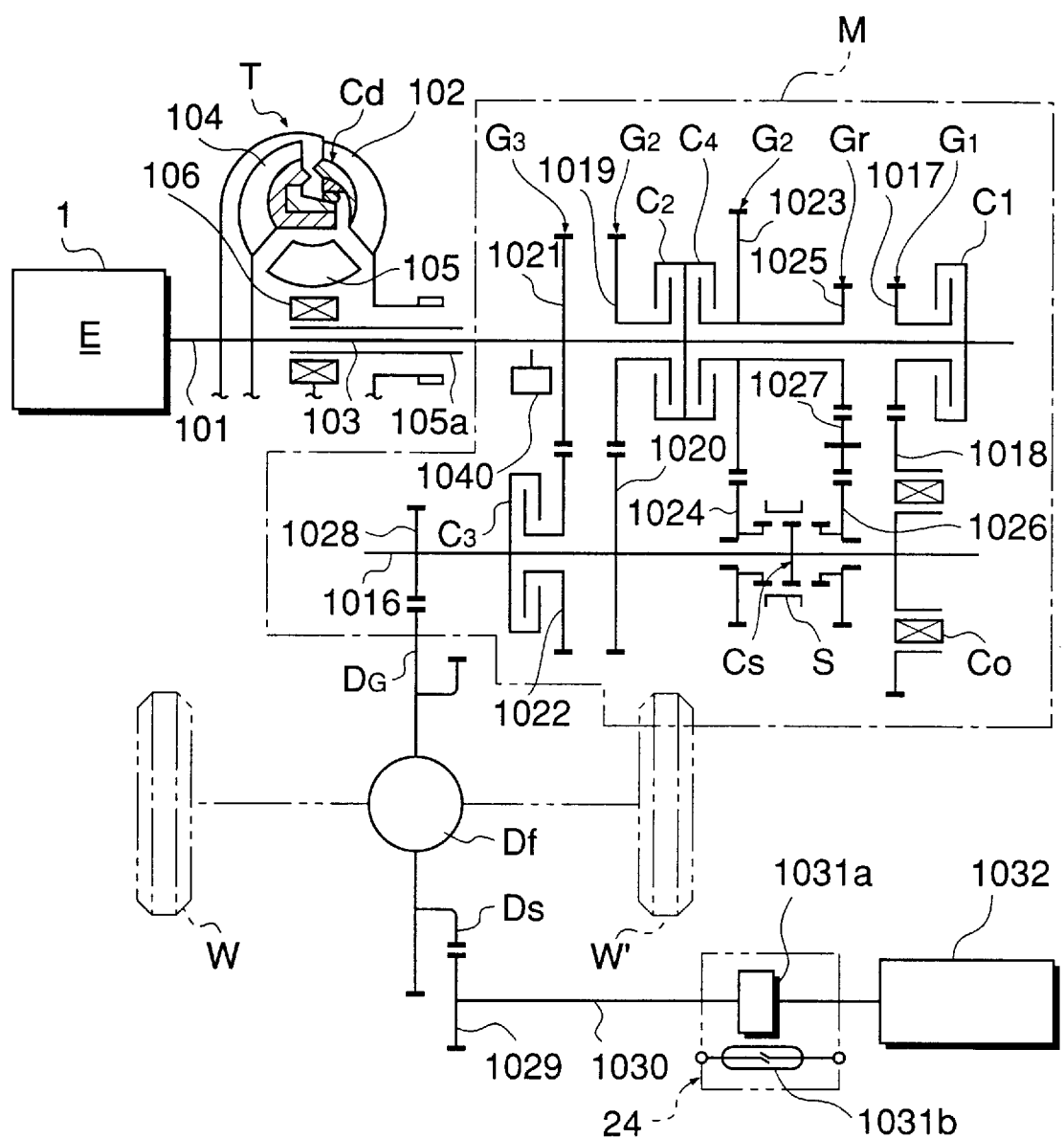
FIG. 4 is a diagram schematically showing the construction of an automatic transmission of the engine in FIG. 3.

FIG. 4 shows the construction of the automatic transmission 26. Output from the engine 1 is transmitted to left and right wheels W and W' of the vehicle through the crankshaft 101 of the engine, a hydraulic torque converter T, an auxiliary transmission M, and a differential Df in the mentioned order.

The hydraulic torque converter T is comprised of a pump 102 coupled to the crankshaft 101, a turbine 104 coupled to an input shaft (main shaft) 103 of the auxiliary transmission M, and a stator 105 coupled, via a one-way clutch 106, to a stator shaft 105a which in turn is supported on the input shaft 103 for rotation relative thereto. Torque is transmitted from the crankshaft 101 to the pump 102, and then to the turbine 104 in a hydrodynamic manner. When amplification of torque takes place while torque is transmitted from the pump 102 to the turbine 104, the resulting reaction force is borne by the stator 105, as is already known.

A lock-up clutch Cd is interposed between the pump 102 and the turbine 104 for mechanically coupling them together.

The auxiliary transmission M has an output shaft (counter shaft) 1016 extending parallel with the input shaft 103, and is provided with a first-speed gear train G1, a second-speed gear train G2, a third-speed gear train G3, a fourth-speed gear train G4, and a reverse gear train Gr, all arranged in juxtaposition between the input and output shafts 103 and 1016. The first-speed gear train G1 is comprised of a driving gear 1017 connectible to the input shaft 103 through a first-speed clutch C1, and a driven gear 1018 connectible to the output shaft 1016 through a one-way clutch C0 and engaging with the driving gear 1017. The second-speed gear train G2 is comprised of a driving gear 1019 connectible to the input shaft 103 through a second-speed clutch C2, and a driven gear 1020 secured to the output shaft 1016 and engaging with the driving gear 1019, while the third-speed gear train G3 is comprised of a driving gear 1021 secured to the input shaft 103, and a driven gear 1022 connectible to the output shaft 1016 through a third-speed clutch C3 and engaging with the driving gear 1021. The fourth-speed gear train G4 is comprised of a driving gear 1023 connectible to the input shaft 103 through a fourth-speed clutch C4, and a driven gear 1024 connectible to the output shaft 1016 through a selector clutch Cs and engaging with the driving gear 1023. On the other hand, the reverse gear train Gr is comprised of a driving gear 1025 formed integrally with the driving gear 1023 of the fourth-speed gear train G4, a driven gear 1026 connectible to the output shaft 1016 through the selector clutch Cs, and an idle gear 1027 engaging with the gears 1025 and 1026. The selector clutch Cs is arranged between the driven gears 1024 and 1026 of the fourth-speed gear train G4, and has a selector sleeve S which is shiftable between a left or forward position and a right or reverse position as viewed in FIG. 3, to selectively connect the driven gear 1024 or the driven gear 1026 to the output shaft 1016. The one-way clutch C0 permits the driving torque from the engine 1 alone to be transmitted to the driving wheels W, W', while inhibiting transmission of torque from the driving wheels W, W' to the engine 1.

If the first-speed clutch C1 alone is engaged while the selector sleeve S is held in the forward position as illustrated in FIG. 4, the driving gear 1017 is connected to the input shaft 103 to establish the first-speed gear train G1, thereby allowing transmission of torque from the input shaft 103 to the output shaft 1016 therethrough. Then, if the second-speed clutch C2 is engaged with the first-speed clutch C1 maintained in its engaged state, the driving gear 1019 is connected to the input shaft 103 to establish the second-speed gear train G2 through which torque can be transmitted from the input shaft 103 to the output shaft 1016. That is, even while the first-speed clutch C1 is engaged, the second-speed gear train G2, the third-speed gear train G3 or the fourth-speed gear train G4 can be established by the action of the one-way clutch C0, rendering the first-speed gear train G1 approximately inoperative. If the second-speed clutch C2 is disengaged and the third-speed clutch C3 is engaged instead, the driven gear 1022 is connected to the output shaft 1016 to establish the third-speed gear train G3, while if the third-speed clutch C3 is disengaged and the fourth-speed clutch C4 is engaged instead, the driving gear 1023 is connected to the input shaft 103 to thereby establish the fourth-speed gear train G4. On the other hand, if the fourth-speed clutch C4 alone is engaged while the selector sleeve S of the selector clutch Cs is shifted to the right or reverse position, as viewed in FIG. 3, the driving gear 1025 and the driven gear 1026 are connected, respectively, to the input shaft 103 and the output shaft 1016 to establish the reverse gear train Gr, through which reverse torque is transmitted from the input shaft 103 to the output shaft 1016.

The torque transmitted to the output shaft 1016 is then transmitted through an output gear 1028 mounted on one end of the output shaft 1016 to an enlarged gear DG of the differential Df. A gear Ds is secured to the enlarged gear DG and engaged with a gear 1029, and a speedometer cable 1030 has one end thereof secured to the gear 1029 and the other end to a speedometer 1032 of the vehicle via a magnet 1031a of the vehicle speed sensor 24, respectively. The magnet 1031a is thus driven through the gears Ds and 1029 and the speedometer cable 1030 to indicate the traveling speed of the vehicle, while the vehicle speed sensor 24 is comprised of the aforementioned magnet 1031a, and a reed switch 1031b driven by the magnet 1031a, for instance. Rotation of the magnet 1031a in unison with the speedometer cable 1030 causes alternate closing and opening of the reed switch 1031b, and an on-off signal indicative of closing and opening of the reed switch 1031b is supplied to the ECU 5.

Arranged on the main shaft 103 is a rotational speed sensor 1040 of a magnetic pickup type for detecting the rotational speed Nm of the main shaft 103, an output signal of which is delivered to the ECU 5. An output signal indicative of the rotational speed Nc of the counter shaft 1016 obtained from the speedometer cable 1030 is also delivered to the ECU 5. The input/output rotational speed ratio ECL, i.e. the ratio of the counter shaft rotational speed Nc to the main shaft rotational speed Nm can be expressed as (NE×r)/Nm, where r represents the gear ratio between the main shaft 103 and the counter shaft 1016. The input/output rotational speed ratio ECL assumes 1.0 when there occurs no slip in the selected speed clutch, while it assumes a value less than 1.0 when a slip occurs in the selected speed clutch.

Figure 5:
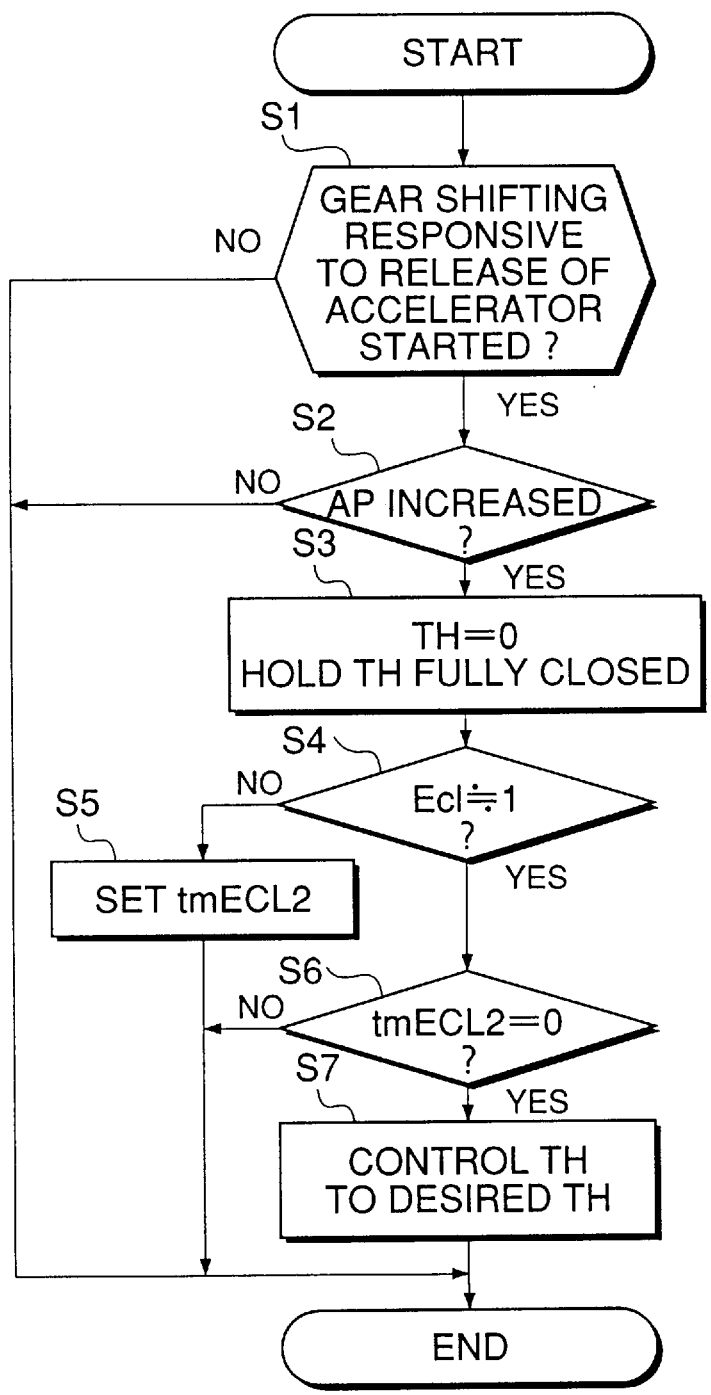
FIG. 5 is a flowchart showing a routine for carrying out gear shifting control of the automatic transmission, which is executed by an ECU appearing in FIG. 3.

FIG. 5 shows a routine for carrying out gear-shifting control of the automatic transmission 26, which is executed by the ECU 5. FIGS. 6A to 6G show the relationship in timing between the accelerator opening AP, the throttle valve opening TH, a gear shifting command, the input/output rotational speed ratio ECL of a target speed position clutch (i.e. a clutch to be engaged through gear shifting) of the transmission, an ECL-determining timer tmECL2, the driving force of the vehicle, and hydraulic pressures for operating a formerly selected clutch and the target speed position clutch, respectively, during an upshift started upon release of the accelerator pedal.

First, at a step S1 in FIG. 5, it is determined whether or not the gear shifting command for instructing an upshift has been issued in response to release of the accelerator pedal during traveling of the automotive vehicle. This determination is carried out by determining whether or not a sharp decrease in the accelerator opening AP has been detected by the accelerator opening sensor 25 and at the same time by referring to the gear shift position detected by the gear position sensor 26b, during traveling of the automotive vehicle.

If it is determined at the step S1 that the gear shifting command has not been issued, the program is immediately terminated, whereas if it is judged that the gear shifting command has been issued to instruct starting of an upshift (time point t1 in the timing chart of FIGS. 6A–6G), the hydraulic pressure for operating the formely engaged clutch (clutch engaged before the upshift) is relieved, and it is determined at a step S2 whether or not the accelerator opening AP has been again increased. When this step is first carried out, the accelerator opening AP has not been increased, and then the program is immediately terminated.

If it is determined at the step S2 that the accelerator opening AP has been increased (time point t2 in FIG. 6A), the throttle valve opening TH is set to 0 degrees, and hydraulic pressure applied to the target speed position clutch is increased by a predetermined increment to cause the target speed position clutch to start to be engaged (step S3). As the steps S1 to S3 are repeated, the hydraulic pressure for the target speed position clutch is progressively increased to proceed the engagement of the clutch.

Then, it is determined at a step S4 whether or not an input/output rotational speed ratio of the transmission of the target speed position clutch, i.e. the input/output rotational speed ratio ECL assumed with the target speed position clutch engaged, is approximately equal to "1". This determination is carried out by calculating the input/output rotational speed ratio ECL based on the output signal indicative of the rotational speed Nm of the main shaft 103 from the rotational speed sensor 1040 and the output signal indicative of the rotational speed Nc of the counter shaft 1016 from the speedometer cable 1030, by the use of the equation of ECL=(Nc×r)/Nm where r represents the gear reduction ratio of the automatic transmission assumed when the target speed position is engaged in the present case.

When this step S4 is first carried out, the input/output rotational speed ratio ECL assumed with the target speed position clutch engaged is not approximately equal to "1", and then the program proceeds to a step S5, wherein the ECL-determining timer tmECL2 is set to a predetermined time period required to elapse before the hydraulic pressure for operating the target speed position clutch becomes high enough to engage the same clutch, followed by terminating the program.

On the other hand, if it is judged at the step S4 that the input/output rotational speed ratio ECL assumed with the target speed position clutch engaged is approximately equal to "1" (time point t3 in FIG. 6D), the program proceeds to a step S6, wherein it is determined whether or not the count of the ECL-determining timer tmECL2 set at the step S5 is equal to "0". If the count of the timer tmECL2 is not equal to "0", it is judged that the predetermined time period has not elapsed, and then the program is immediately terminated. If the count of the timer tmECL2 is equal to "0" (time point t4 in the FIG. 6E), it is judged that the hydraulic pressure for operating the target speed position clutch is at a level sufficient to engage the same clutch, and then the program proceeds to a step S7, wherein control of the throttle valve opening TH is started, whereby the actual value of the throttle valve opening TH is made equal to a desired value determined based on the actual accelerator opening AP, followed by terminating the program.

As described above, according to the present embodiment, even when the accelerator pedal is again stepped on during an upshift started upon release of the accelerator pedal, the throttle valve is set into a closed position instead of being instantly opened, but permitted to be opened only after the engagement of the target speed position clutch is completed. As a result, it is possible to prevent a sudden rise in the engine rotational speed caused by the stepping-on of the accelerator pedal during the upshift as well as a shock caused by the gear shifting.

What is claimed is:

1. A control system for an internal combustion engine for an automotive vehicle, said vehicle having an accelerator pedal, and an automatic transmission, said automatic transmission having a plurality of speed clutches, said speed clutches each having an input side and an output side, said engine having an intake passage, and a throttle valve arranged in said intake passage, the control system comprising:

stepping-on amount-detecting means for detecting a stepping-on amount of said accelerator pedal;

upshifting means for carrying out an upshift of said automatic transmission when said stepping-on amount-detecting means detects a sudden decrease in said stepping-on amount;

throttle valve opening control means for closing said throttle valve when said stepping-on amount has increased during said upshift after said sudden decrease in said stepping-on amount; and clutch control means for starting engagement of one of said speed clutches to be selected for said upshift upon said closing of said throttle valve by said throttle valve control means;

said throttle valve opening control means starting control of opening of said throttle valve in response to said stepping-on amount of said accelerator pedal after rotational speed of said output side of said one of said speed clutches and rotational speed of said input side of said one of said speed clutches become substantially equal to each other through said engagement of said one of said speed clutches effected by said clutch control means.

2. A control system according to claim 1, wherein said throttle valve opening control means starts said control of said opening of said throttle valve upon lapse of a predetermined time period after said rotational speed of said output side of said one of said speed clutches and said rotational speed of said input side of said one of said speed clutches become substantially equal to each other.

3. A control system according to claim 2, wherein said predetermined time period is set to a time period required for hydraulic pressure for operating said one of said speed clutches to become high enough to engage said one of said speed clutches.

* * * * *